United States Patent [19]

Vesterling

[11] 4,419,694
[45] Dec. 6, 1983

[54] FREQUENCY-SENSITIVE SWITCHING CIRCUIT AND METHOD

[75] Inventor: Friedrich Vesterling, Blasdell, N.Y.

[73] Assignee: WNY Hospital Television, Inc., Buffalo, N.Y.

[21] Appl. No.: 357,775

[22] Filed: Mar. 12, 1982

[51] Int. Cl.³ .............................................. H04N 5/44
[52] U.S. Cl. .................................. 358/181; 328/137; 328/154
[58] Field of Search ........................ 358/181, 183, 22; 455/133–135, 140; 307/239, 241, 243; 328/137, 104, 152, 154

[56] References Cited

U.S. PATENT DOCUMENTS 4,329,675  5/1982  Van Hulle ............................ 358/181
4,361,854 11/1982  Wolfe .................................. 358/181

Primary Examiner—Michael A. Masinick
Attorney, Agent, or Firm—Sommer & Sommer

[57] ABSTRACT

A frequency-sensitive switching circuit includes a selectively-operable switch and a sampling circuit for controlling the switch. First and second signals are supplied to the switch. The first signal is also supplied to the sampling circuit, which senses the frequency of a series of pulses therein and compares such sensed pulse frequency with a set frequency. If the sensed pulse frequency is within the band width of the set frequency, the switch passes the first signal to an output terminal. If the sensed pulse frequency falls outside the band width of the set frequency, the switch passes the second signal to the output terminal.

10 Claims, 2 Drawing Figures

FREQUENCY-SENSITIVE SWITCHING CIRCUIT AND METHOD

BACKGROUND OF THE INVENTION

1. Field of the Invention

The present invention relates generally to the field of switching circuits, and more particularly to an improved frequency-sensitive switching circuit which operates to prefer passage of one signal whenever certain conditions are met.

2. Description of the Prior Art

Television programming has undergone a variety of changes in recent years. With cable TV, video taping, and computer-programmed information now available, it is sometimes desired to provide a preferred first signal, with the capability for automatic switching to an alternative second signal in the event of completion or interruption of the first signal. For example, in some hotel television, certain channels may be reserved for movies. It may be desirable to provide alternative programming upon completion or failure of the first signal. Such alternative programming may, for example, convey educational information or the like.

SUMMARY OF THE INVENTION

The present invention provides an improved switching circuit, particularly adapted for use in such television environment, which prefers passage of a first signal, but which automatically provides for passage of an alternative second signal, upon interruption of the first signal.

The apparatus of the improved switching circuit broadly includes a relay switch at a sampling circuit. The first signal normally having a repetitious series of pulses, has a second input terminal adapted to be supplied with a second signal, and has an output terminal. The switch is operable in response to a command signal provided by the sampling circuit to electrically connect the output terminal alternatively with either the first or second input terminals. The sampling circuit is adapted to be supplied with the first signal and is arranged to produce a command signal for operating the switch. The sampling circuit senses the pulse frequency in the first signal and operates to connect the output and first switch terminals whenever the sensed frequency differs from a set frequency by less than a known amount, and operates to correct the output and second switch frequency by more than the known amount.

In use, the inventive switching circuit performs an improved method of automatically switching between alternative conductive paths through a remotely-operated switch, which comprises steps of: sensing for the frequency of pulses in a a first signal; comparing such sensed frequency with a set frequency; operating said switch to provide a first conductive path through said switch when the sensed frequency differs from a set frequency by less than a known amount; and operating said switch to provide a second conductive path through said switch when the sensed frequency differs from the set frequency by more than a known amount.

Accordingly, the general object of the invention is to provide an improved switching circuit.

Another object is to provide an improved switching circit which is sensitive to the frequency of a parameter of the first signal.

Another object is to provide an improved frequency-sensitive switching circuit which is adapted to switch to standby television programming upon interruption of preferred primary programming.

Another object is to provide an improved method of automatically switching between alternative conductive paths through a remotely-operated switch.

These and other like objects and advantages will become apparent from the foregoing and ongoing written specification, the drawings, and the appended claims.

DESCRIPTION OF THE PREFERRED EMBODIMENT(S)

Figure 1:
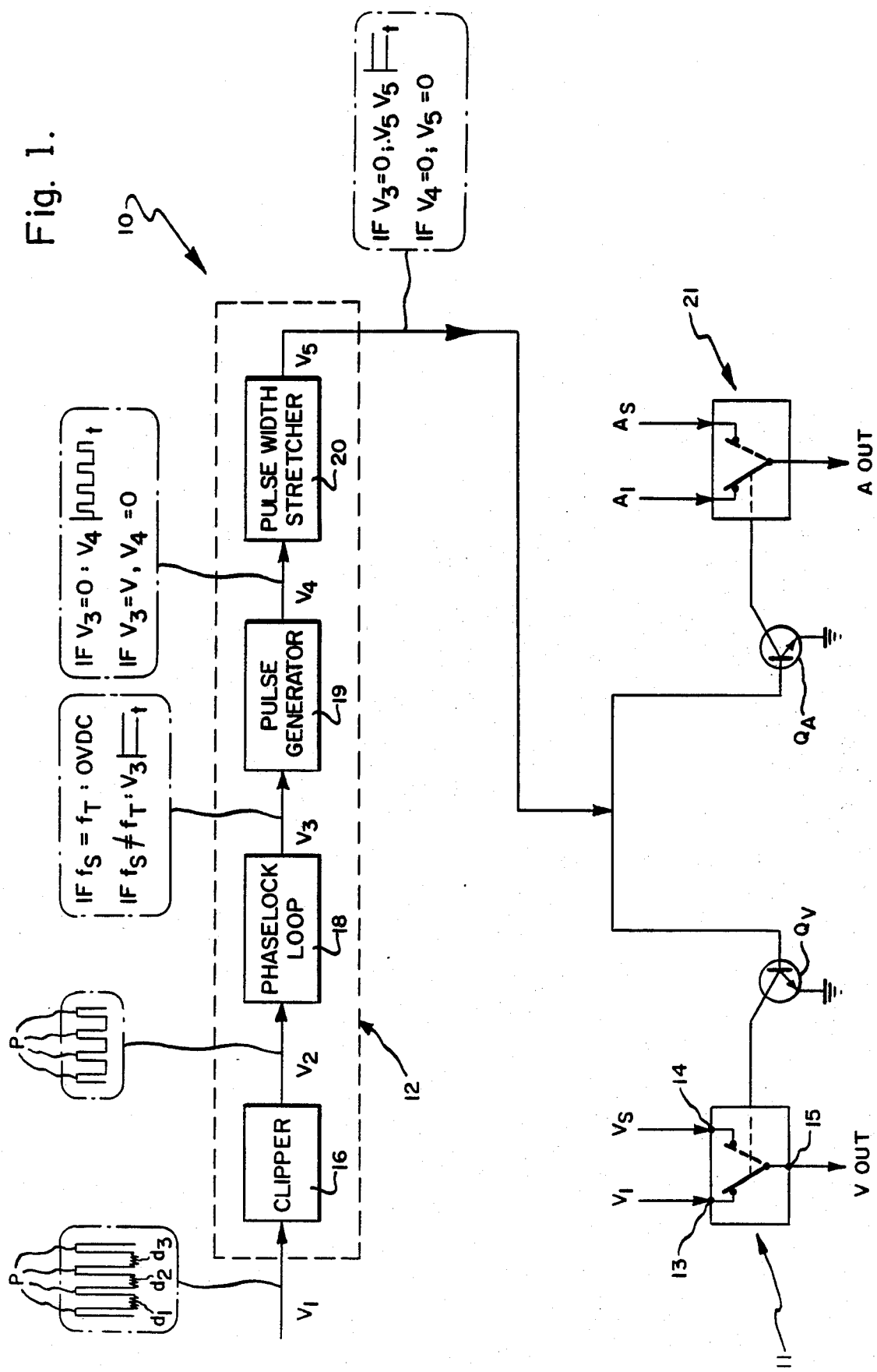
FIG. 1 is a schematic block diagram of the improved switching circuit.

At the outset, it should be clearly understood that like reference numerals are intended to identify the same elements, signals and/or structure consistently throughout the several drawing figures, as such elements, signals and/or structure may be further described or explained by the entire written specification, of which this detailed description is an integral part.

Referring now to the drawings, and more particularly to FIG. 1 thereof, the invention provides an improved switching circuit, of which the presently-preferred embodiment is generally indicated at 10. While switching circuit 10 has a large member of potential uses, it is deemed particularly applicable for use in selectively switching television signals, and functions to display a standby or alternative video signal in the event of a failure or absence of a preferred video signal. Briefly, the improved switching circuit 10 continuously samples the preferred video program for the presence of a repetitious series of pulses therein, and automatically switches to the second or standby video program if such sensed pulse frequency differs from a desired frequency by more than a known amount.

As schematically indicated in FIG. 1, the improved switching circuit 10 broadly induces a relay switch 11, and a sampling circuit 12.

The switch 11 is shown as having a first input terminal 13 adapted to be supplied with a first signal $V_1$ from an external source (not shown), having a second input terminal 14 adapted to be supplied with a second or standby signal $V_s$ from another external source (not shown), and having an output terminal 15. Switch 11 is operable in response to a command signal supplied by the sampling circuit 12, to electrically connect the output terminal 15 with either the first input terminal 13 (as indicated in solid in FIG. 1) or with the second input terminal 14 (as indicated in phantom in FIG. 1).

The sampling circuit 12 is schematically shown as including a clipper 16, a phase-lock loop 18, a pulse generator 19, and a pulse-width stretcher 20. The first signal $V_1$ is supplied to clipper 16. The first signal $V_1$ normally has a repetitious series of pulses P. For example, signal $V_1$ may be a television video signal with pulses P representing horizontal synchronization pulses separated by video data ($d_1$, $d_2$, $d_3$, . . . $d_n$) for each horizontal line. Such horizontal synchronization pulses appear in a normal video signal at a frequency of about 15,750 cycles per second. Such first signal $V_1$ is supplied to clipper 16, which passes as its output $V_2$ a series of clipped pulses of like frequency but devoid of intermediate video data.

Signal $V_2$ is then supplied to phase-lock loop 18, which functions to sense the pulse frequency in signal $V_2$ and to compare such sensed frequency ($f_s$) with a set or tuned frequency ($f_t$). If signal $V_1$ is a video signal, the phase-lock loop may be tuned to a frequency of 15,750 cycles per second, this being the normal frequency of the horizontal synchronization pulses P in signal $V_1$. If the sensed pulse frequency ($f_s$) is within the band width of the tuned frequency ($f_t$), the phase-lock loop's output signal ($V_3$) will be 0 VDC. On the other hand, if such sensed frequency ($f_s$) differs from the tuned frequency ($f_t$) by more than the band width, then output signal $V_3$ will be a constant D.C. output voltage.

Signal $V_3$ is supplied as an input to pulse generator 19. If $V_3$ is a constant D.C. voltage, then the pulse generator's output signal $V_4$ will be zero. On the other hand, if $V_3 = 0$ VDC, then the pulse generator will produce a repetitious series of pulses as signal $V_4$.

Signal $V_4$ is, in turn, supplied to a pulse-width stretcher. If $V_4$ is zero, then the pulse-width stretcher's output signal will like-wise be zero. If pulse generator 19 produces a series of pulses in output signal $V_4$, then output signal $V_5$ will be a constant D.C. voltage. Signal $V_5$ represents the command signal, and is supplied to transistor $Q_v$ to operate switch 11. When $V_3 = 0$ (i.e., $f_s = f_t \pm$ band width), then the command signal will be a constant voltage, and switch output terminal 15 will be electrically connected to input terminal 13, thereby allowing the first signal $V_1$ to pass through the switch. However, if a constant voltage appears as signal $V_3$ (i.e., $f_s \neq f_t \pm$ band width), then signal $V_5$ will be zero, operating switch 11 so as to alternatively connect second input terminal 14 with output terminal 15 and permitting second or standby signal $V_s$ to pass through the switch. If used in the television application described above, command signal $V_5$ may also be supplied to a transistor $Q_A$ to operate an audio switch 21 in the same manner as switch 11. Thus, the improved switching circuit 10 operates to prefer the first signal upon the presence therein of a sensed pulse frequency within certain limits, and to alternatively permit passage of a second signal upon the balence of such desired pulse frequency range.

Figure 2:
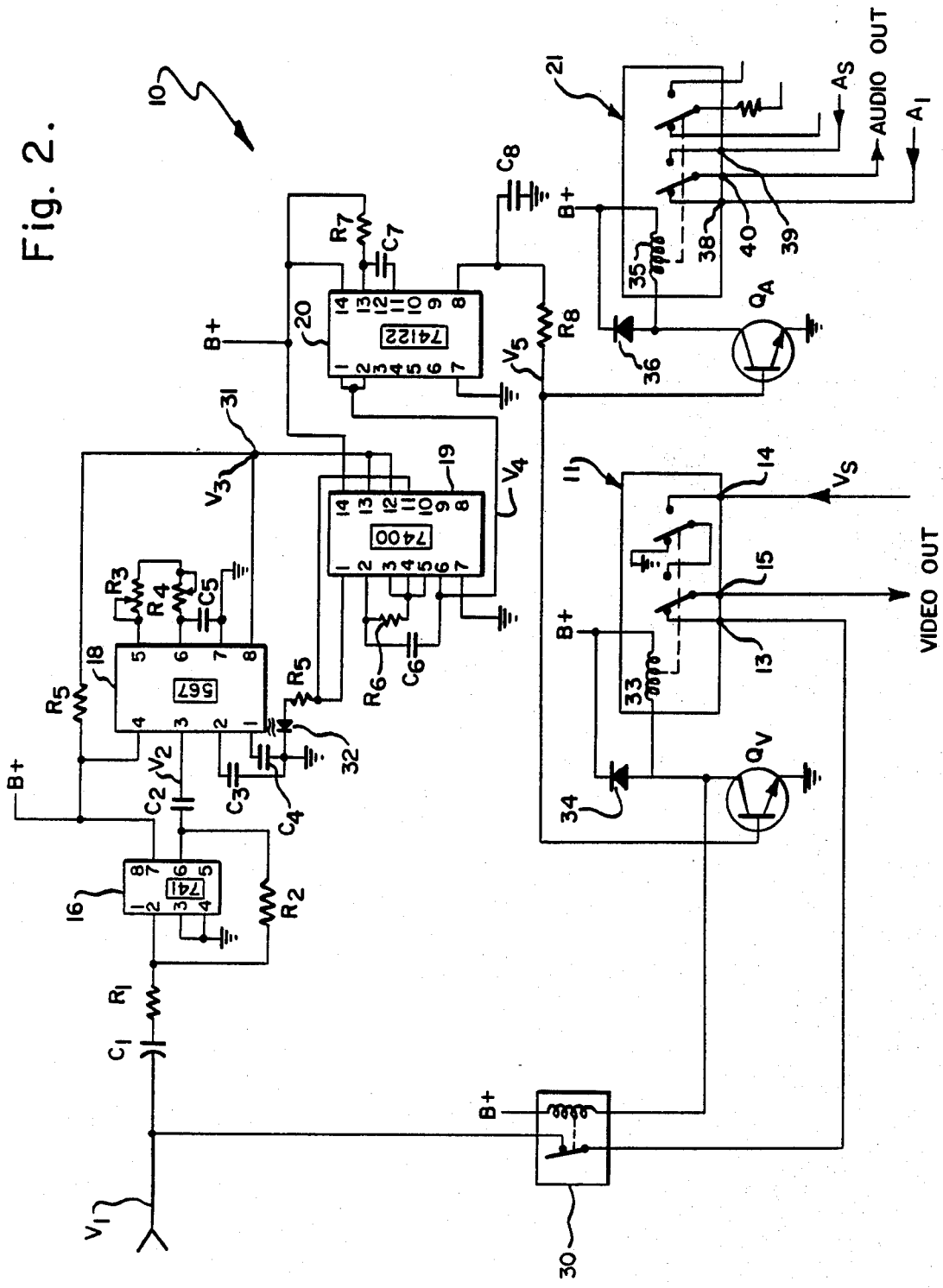
FIG. 2 is an electrical schematic of the specific circuitry thereof.

Preferred Circuit (FIG. 2)

The presently preferred embodiment of the improved switching circuit 10 is depicted in FIG. 2, and will now be described with respect to the television application mentioned above.

Clipper 16 is a standard operational amplifier (IC 741) having eight pins. The preferred or first video signal $V_1$ is supplied to clipper pin "2" through a blocking capacitor $C_1$ and an isolation and attenuation resistor $R_1$, and is also supplied to switch input terminal 13 through an isolation relay 30. Power from source B+ is supplied to clipper pin "7". Pins "3" and "4" are grounded. Pins "6" and "2" are connected by a feedback resistor $R_2$, which determines the gain of the amplifier. The clipper's RC circuit (including resistor $R_1$ and capacitor $C_1$) functions to pass only a small sample of video signal $V_1$ to the clipper, with the balance of signal $V_1$ being supplied to switch 11. The clipper output signal $V_2$ appears at pin "6", and is supplied through a coupling capacitor $C_2$ to pin "3" of phase-lock loop 18.

Phase-lock loop 18 is a standard phase-lock loop element (IC 567) having eight pins. Power from source B+ is supplied to pin "4". Pin "2" is grounded through capacitor $C_3$, and pin "1" is grounded through capacitor $C_4$. Pin "7" is also grounded. Pins "5" and "6" are connected via variable resistors $R_3$ and $R_4$. Pin "6" is grounded through capacitor $C_5$. Node 31, which receives power from source B+ through resistor $R_5$, is connected to pin "8" of the phase-lock loop. The phase-lock loop's RC circuit (including resistors $R_3$, $R_4$ and capacitor $C_5$) determines the set frequency to which the phase-lock loop may be selectively tuned, with resistor $R_3$ providing a coarse adjustment and resistor $R_4$ providing a fine adjustment. Capacitors $C_3$ and $C_4$ determine the band width of the tuned frequency. The phase-lock loop output signal $V_3$ appears at node 31. When the sensed pulse frequency of signal $V_2$ is within the band width of the set frequency, pin 8 will be grounded, thereby shorting node 31. When the sensed pulse frequency exceeds the band width of the set frequency, power from source B+ will exit at node 31.

The pulse generator 19 is a standard NAND gate (IC 7400) having fourteen pins. The signal $V_3$, appearing at node 31, is supplied to pulse generator pins "12" and "13". Power from source B+ is supplied to pin "14". Pins "11" and "1" are grounded through a current limiting resistor $R_5$ and a light emitting diode (LED) 32. Pin "7" is grounded. Pins "2" and "6" are connected through capacitor $C_6$. Pin "2" is connected to each of pins "3", "4" and "5" through resistor $R_6$. The pulse generator output signal $V_4$ appears at pin "6". The pulse generator's RC circuit (formed by resistor $R_6$ and capacitor $C_6$) causes the NAND gate to function as an oscillator, generating a repetitious series of pulses whevever the voltage at node 31 is zero.

The pulse width stretcher 20 is a retriggerable monostable multivibrator (IC 74122) having fourteen pins. Power from source B+ is supplied to pin "14", and is also supplied to pin "13" through resistor $R_7$. Pins "11" and "13" are connected by capacitor $C_7$. Pin "7" is grounded. The pulse generator output signal $V_4$ is supplied to pulse width stretcher pins "1" and "2". The output signal of the pulse width stretcher is filtered by grounded capacitor $C_8$, passes through current limiting resistor $R_8$, and is supplied as command signal $V_5$ to the bases of transistors $Q_V$ and $Q_A$. The emitters of both transistors are grounded. Power from source B+ is supplied through coil 33 of switch 11 to the collector of transistor $Q_V$. A diode 34 is arranged in parallel with coil 33, and is arranged to oppose the current flow from source B+ to ground. Similarly, power from source B+ is supplied through coil 35 of switch 21 to the collector of transistor $Q_A$, and diode 36 is arranged in parallel with coil 35 to oppose the normal current flow from source B+ to ground. The pulse width stretcher has an RC circuit (including resistor $R_7$ and capacitor $C_7$) which determines the width of the stretched pulses.

Each of switches 11 and 21 is of the double-pole double-throw type, and may be selectively operated by selective energization of its associated coil. The isolation relay 30 and switches 11 and 21 are in the positions shown when signal $V_5$ is a voltage which "closes" transistors $Q_V$ and $Q_A$, thereby allowing current from source B+ to flow to ground through coils 33 and 35. Thus, when transistor $Q_V$ is "closed", the first signal $V_1$ may pass through isolation relay 30 and input terminal 13, to output terminal 15. Similarly, when transistor $Q_A$ is "closed", audio signal $A_1$ supplied to first input terminal 38 may pass to the output terminal 40 of switch 21. In this "closed" condition, current from source B+ may flow to ground through the coil of isolation relay 30, through coil 33 of switch 11, and through coil 35 of switch 21.

However, should signal $V_5$ drop to zero, each of transistors $Q_V$ and $Q_A$ will "open", thereby interrupting the current flow to ground. The magnetic field surrounding coils 33 and 35 will be permitted to collapse through the associated diodes 34 and 36, respectively. Such deenergization of coils 33 and 34 causes the throws of switches 11 and 21 to move to their alternative positions, as indicated in phantom in FIG. 2. At the same time, the coil of isolation relay 30 is deenergized, allowing the isolation relay to open. Thus, when signal $V_5$ falls to zero, so as to "open" transistors $Q_V$ and $Q_A$, the standby video signal $V_S$ supplied to input terminal 14 will be connected to output terminal 15, and the standby audio signal $A_S$ supplied to terminal 39 will be connected to output terminal 40. If desired, the inoperative pole of switch 11 may be grounded (as shown) to prevent any arcing of standby signal $V_S$. While its presence is optional, it is preferably to provide isolation relay 30 to interrupt the first signal $V_S$ before reaching switch 11 to prevent the possibility of arcing across the pole of the switch when transistor $Q_V$ is "open". The second throw of audio switch 21 may be used for some auxiliary purpose not material to an understanding of the present improvement.

The present invention therefore provides an improved frequency-sensitive switching circuit which operates to examine the pulse frequency of a sample of the first signal, and to compare such sensed frequency with a set or tuned frequency. If the sensed frequency is within the band width of the tuned frequency, the improved circuit generates a series of pulses and then stretches such generated pulses to a constant voltage, which in turn is used to close a transistor and energize the coil of a relay switch. However, should each sensed pulse frequency differ from the tuned frequency (e.g., as by an interruption in the supply of signal $V_1$), the switching circuit will automatically permit passage of a standby or second signal. Should the sensed pulse frequency again fall within the band width of the tuned frequency, the improved circuit will again switch back to permit passage of the first signal. Thus, the improved circuit operates to prefer passage of the first signal whenever the sensed pulse frequency therein falls within the band width of the tuned frequency.

While the improved circuit has been described in a television environment, such circuit is not limited to this particular application. The values of the various circuit resistors and capacitors, may be selected by persons skilled in the art to suit the particular application. Indeed functionally equivalent components may be readily substituted for those described. Therefore, while the presently preferred embodiment of the improved switching circuit has been shown and described, and several modifications thereof discussed, persons skilled in this art will readily appreciate that various additional changes and modifications may be made without departing from the scope of this invention, as defined by the following claims.

What is claimed is:

1. A switching circuit, comprising:
    a switch having a first input terminal adapted to be supplied with a first signal normally having a repetitious series of pulses, having a second input terminal adapted to be supplied with a second signal, and having an output terminal, said switch being operable in response to a command signal to electrically connect said output terminal alternatively with said first input terminal or with said second input terminal; and
    a sampling circuit adapted to be supplied with said first signal and arranged to produce said command signal for operating said switch, said sampling circuit being arranged to sense the pulse frequency in said first signal and operable to connect said output and first input terminals whenever the sensed pulse frequency differs from a desired frequency by less than a known amount, and operable to connect said output and second input terminals whenever the sensed pulse frequency differs from said desired frequency by more than said known amount; and
    an isolation relay operatively arranged to interrupt the first signal supplied to said sampling circuit whenever the sensed pulse frequency differs from said desired frequency by more than said known amount.

2. A switching circuit as set forth in claim 1 wherein said sampling circuit includes a comparator operatively arranged to compare the sensed pulse frequency with said desired frequency, and operable to produce one output when said sensed and desired frequencies differ by less than said known amount, and another output when said sensed and desired frequencies differ by more than said known amount.

3. A switching circuit as set forth in claim 1 wherein said comparator is a phase-lock loop.

4. A switching circuit as set forth in claim 3 and further comprising a pulse generator supplied with a signal from said phase-lock loop.

5. A switching circuit as set forth in claim 4 and further comprising a pulse width stretcher arranged to produce a constant voltage output signal when said pulse generator produces pulses.

6. A switching circuit as set forth in claim 5 wherein said constant voltage output signal is said command signal.

7. A switching circuit as set forth in claim 1 wherein said first signal is a television video signal and wherein said pulses therein are horizontal synchronization pulses.

8. A switching circuit as set forth in claim 4 wherein said pulse generator is a NAND gate.

9. A switching circuit as set forth in claim 5 wherein said pulse width stretcher is a retriggerable monostable multivibrator.

10. The method of automatically switching between alternative conductive paths through a remotely-operated switch, comprising the steps of:
    sensing for the frequency of pulses in a first signal;
    comparing such sensed frequency with a set frequency;
    operating said switch to provide a second conductive path through said switch when such sensed frequency differs from said set frequency by more than a known amount;
    generating repetitious series of pulses when such sensed frequency differs from said set frequency by less than said known amount;
    stretching the width of such generated pulses to provide a constant signal having a magnitude equal to the magnitude of such generated pulses;
    operating said switch to provide a first conductive path when said constant signal exists; and
    operating said switch to provide a second conductive path when said constant signal does not exist.

* * * * *